Figure 1:
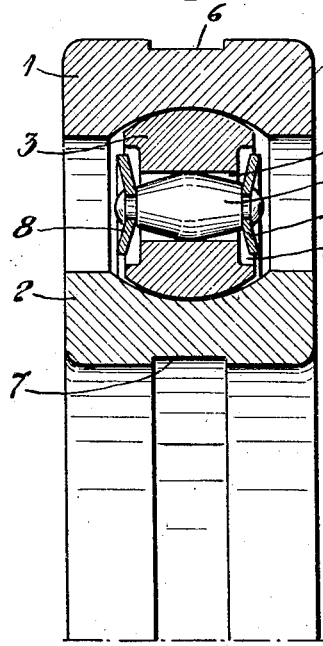

June 24, 1930.　　　　K. O. LEON　　　　1,766,440
ANTIFRICTION BEARING

Filed Dec. 11, 1925

K. O. Leon
INVENTOR

By: Marks and Clark
Attys

Patented June 24, 1930

1,766,440

UNITED STATES PATENT OFFICE

KARL OSKAR LEON, OF LONDON, ENGLAND

ANTIFRICTION BEARING

Application filed December 11, 1925, Serial No. 74,831, and in Sweden December 17, 1924.

This invention refers to antifriction bearings having one or more rows of rolling bodies, and particularly to such bearings having groove-shaped races in the outer race ring as well as in the inner one and having the rolling bodies formed as bodies of rotation having a curved generatrix.

The sustaining power and the length of life of such an antifriction bearing, as well as of antifriction bearings in general, depend, as known, practically on the total size of the contact surfaces between the rolling body and the races and on the maximum stresses within the said surfaces, and when calculating and constructing the rolling bodies and the races, partly with respect to the possibility of filling in the said bodies in the bearing without using special openings, and partly with respect to stresses occurring during the running, the general way has been to use the elasticity of compression of the material of the rollers and of the race rings.

However, in all antifriction bearings stresses occur, which considerably exceed the elastic limit of the material, so that small permanent deformations arise, which gradually appear in the form of cracks in the surface of the material. Then small excortications are formed in the surface, which will in a short time destroy the whole bearing.

This invention has for its object to avoid the said drawbacks and to obtain an antifriction bearing, which, with respect to the load capacity and the insensibility of shocks, considerably surpasses all bearings hitherto known. Besides, the invention has for its object to render it possible to fill in rollers having a greater length or a greater moment of stiffness than has hitherto been possible, without using special parallel filling openings.

The invention consists essentially in this that the rolling bodies or the race rings or both are constructed in such manner as to utilize also their bending elasticity during the running of the bearing or at the filling in of the said bodies between the race rings or in both cases. To this end, in case of a roller bearing, the rollers may, preferably, be provided with axially located apertures of such a shape that the bending elasticity can be utilized, and the rollers may to the same end also be provided with concentrical and symmetrical recesses in their end surfaces. The one race ring or both may at the side opposite to the race be provided with annular recesses having such a shape and location that the bending elasticity can be utilized. The rollers, the length of which may be less than the diameter of the roller, may, preferably, be constructed in such manner that the difference between the radius of curvature of the generatrix of the roller and the radius of curvature of the generatrix of the race will be such a one that upon greater loads the contact takes place along the greater part of the length of the roller, without exceeding the limit of elasticity, whereas upon lower loads the contact takes place along a small part only of the length of the roller. Further, the relation between the radius of curvature of the generatrix of the roller and that of the generatrix of the race ought to be such that the axial extension of the contact surface will be equal to or greater than the width of the recesses in the race rings, before the stress in the ring material reaches the limit of elasticity of exhaustion.

By utilizing the bending elasticity, partly considerably greater contact surfaces can be obtained, partly the molecule mass pertaining in the work of resistance will be increased, and partly also the radii of curvature will be increased, whereby tension stresses in the surface layers of the material is decreased, which phenomenon is of a considerable importance as to the length of life of the bearing.

Figure 2:
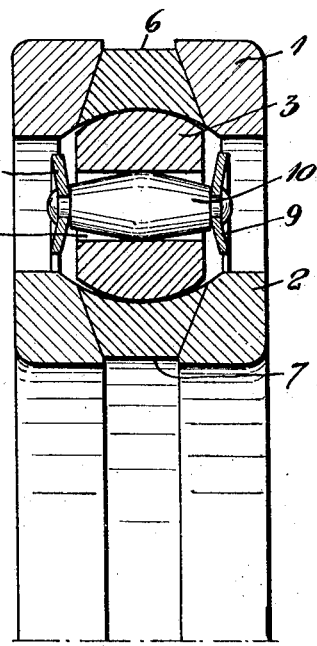
Figure 3:
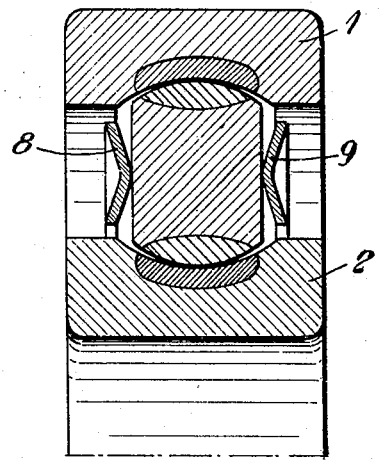

In the accompanying drawing, two forms of embodiment of a single row roller bearing according to this invention are shown. Fig. 1 is an axial section of part of a roller bearing according to the one form of embodiment, and Fig. 2 is a similar section of part of the bearing according to the second form of embodiment. Fig. 3 is an axial section of part of a known roller bearing.

Referring to the drawing, 1 designates the outer race ring and 2 the inner race ring, said rings being provided with grooved races of a known type, rollers 3 having a curved generatrix being located between said races. According to the invention, the said rollers 3 are provided with an axial aperture 4 having such dimensions that the bending elasticity of the roller can be utilized partly at the mounting of the bearing, i. e. at the filling in of the rollers between the race rings 1 and 2, and partly during the running of the bearing. According to Fig. 1, there are, besides, made concentrical recesses 5 in the end surfaces of the rollers, said recesses increasing the bending elasticity at the ends of the roller, whereas according to Fig. 2 such recesses have not been made.

The race rings 1 and 2 are, at the sides located opposite to the grooved races, provided with annular recesses 6 and 7, respectively, having such a width that the bending elasticity can be utilized also with respect to the rings.

The rollers are guided by means of cages comprising rings 8 and 9 located at the sides of the rollers and held together by means of gudgeons 10 passing through the rollers and having such a shape as not to prevent the rollers from adjusting themselves under the influence of forces occurring during the running.

The assembling of the bearing may be performed in such a manner known per se that, while placing the race rings 1 and 2 in a concentrical position with relation to each other, the roller is introduced from the side having its end surfaces placed at right angles to the radius of the race rings at the filling place, and then the roller is swung to the position shown in the figures while using a certain force. The possibility of swinging the roller into the working position in the manner described above depends, as known, on the relation between the radius of the great circle of the roller and the radius of curvature of generatrix of the roller. If the said relation be equal to 1, i. e. that the running surface of the roller is spherical, the said swinging movement can easily take place independent of the relation between the diameter of the roller and the length thereof. If, on the other hand, the radius of curvature of the generatrix of the roller be made greater than the radius of the great circle of the roller, the length of the roller has to be decreased to the same degree as does the difference between the said radii increase, since, when forcing the roller into the working position, the limit of elasticity of the material of the race rings and of the roller must not be exceeded. Thus, if it were possible to increase the capacity of compression of the material without exceeding the said limit of elasticity, also the difference between the said radii could evidently be made greater or, at a certain relation between the said radii, the length of the roller could be made relatively greater with respect to the diameter of the roller.

The said object is gained according to the invention by this that the race rings and, if desired, also the rollers are constructed in such manner that not the elasticity of compression only but also the bending elasticity has been utilized.

However, the said condition is of the greatest importance also with respect to the sustaining power and the duration of the bearing during the running, since the risk of injuries due to overloads or accidental radial or axial thrusts has been considerably decreased. Besides, the running of the bearing will be considerably smoother and more silent.

Statical compression tests have proved that, by the provision of an annular recess at the sides of the race rings opposite to the races, the elasticity of the bearing may be more than doubled, and practical tests with roller bearings of the said construction have proved that they have prevailed in cases, where the same bearing, before making the said recesses, as well as other known bearings have been torn up in a relatively short time. From a theoretical point of view this is easily explicable, since, as mentioned, by the utilizing of the bending elasticity partly considerably greater contact surfaces are obtained, partly a greater molecule mass partakes in the working, and partly the radii of curvature of the wave combs are increased, whereby the tension stresses in the surface layers of the material are decreased.

When a circular body, such as for instance a ball or a roller, rolls forward under pressure a wave-formation in the material arises similar to that formed in a fluid, for instance water. The wave-formation in such a medium is a pendulum motion having the centre of pendulum located at a greater or smaller depth depending on the length of the wave. The stress, i. e. the force tending to separate the molecules, grows from the centre of pendulum onto the surface or level, where it obtains its maximum value.

If the pressure exerted by the rolling body be so great that the limit of elasticity of the material is exceeded, the real condition will be this that the pressure is so great that the molecules at one or more places in the surface layers of the wave combs, have been separated to such an extent that the molecular attraction forces are not able to bring back the molecules to their initial position. The phenomenon can practically be compared with the rolling of a weight over a cover of ice. On account of the fact that the molecules located at the surface of the material have no molecules tending to pull them upwards, there will be formed in the surface a layer having a greater hardness than has the other material. At the formation of the waves the molecules will be separated to a greater extent in the horizontal direction than in the vertical direction, and, consequently, there will at the first hand arise small vertical splits corresponding to the splits in a cover of ice. After a certain number of such vertical splits or cracks have arisen, the vertical bars thus formed will oscillate to such a degree that the molecular forces in the vertical direction will be exceeded, so that also horizontal splits or cracks arise, and, when the said last mentioned splits extend over the whole of the vertical bar, the said piece will be loosened and an excortication in the surface of the material arises.

Thus, the problem when constructing an antifriction bearing is to make a bearing, where the displacement of the molecules has a minimum value. This will be obtained in such way that the number of molecules partaking in the working has a maximum value at the same time as their movement with relation to each other, at the moment when they meet with one another, i. e. reach each reaction range, has its minimum value.

The cross-ruled zone, Figs. 2 and 3, indicates a cross-section of the molecule masses partaking in the resistance work, viz, Fig. 2, when the elasticity of compression as well as the bending elasticity is utilized, and Fig. 3, when the elasticity of compression only is capable to partake in the work.

The relative magnitude of the said two factors is, theoretically, hard to calculate, but, practically, the velocity, with which the molecules meet with one another, is the main point. At a given speed of revolution and at a given load the length of life would, thus, be doubled, when the bending elasticity is equal to elasticity of compression, as is the case in a bearing according to the present invention, a new factor, i. e. the inertia of the mass, will, however, play in, which decreases the action of the bending elasticity to a somewhat higher degree than that of the elasticity of compression. As, however, in the bearing according to the present invention the bending elasticity also of the rollers is utilized it is easily conceived, what a great superiorness the said bearing construction possesses over all bearings hitherto known. What has been mentioned above is true to a pure axial load. At oblique loads the problem has to be looked upon from a somewhat different point of view, which varies to some extent depending on if the said load is of a momentary or permanent character.

At a momentary oblique load (shock load) the inner race ring is, during its first phase, displaced in the direction of the axial component. This results in that the pressure between the roller and the race ring is transmitted to some degree in the direction opposite to the shock direction and the reaction pressure in the outer race ring is transmitted in the direction of the shock. Thus, at the next phase of the shock the roller will be turned to some extent out of its normal direction of rotation. The geometric axis of the roller, which coincides, practically, with its axis of rotation, is thus caused to form a certain angle with the plane through the axis of rotation of the system and the centre of the roller, and, as a consequence, the roller, i. e., the geometric axis thereof, is caused in the subsequent phase to form a still greater angle with the normal plane of the said plane, i. e. the roller takes up a reaction position against the active force. When the reaction angle has reached its maximum value, the first mentioned angle has returned to zero. The magnitude of the reaction angles is dependent on the kinetic energy of the oblique shock and on the sum of the reaction forces of all rollers, which latter are equal to the sum of the gyratory forces and the axial components of the thrusts. At the reverse phase of the period the reversed relation takes place with the difference only that in this case the elastic forces will be active and bring back the roller to its normal plane of rotation. The gyratory forces delay the movements of the rollers during their tendency to take up their reaction position and are, thus, practically disadvantageous. From this point of view the roller ought to be neutral, i. e. to be constructed in such manner that their gyratory forces are equal to zero. On the other hand, the elastic forces are of a decisive importance, inasmuch as the greater the said forces are the greater is the capacity of the bearing to sustain axial thrusts at a predetermined difference between the axial and rotary generatrix of the roller, and this to a still higher degree than at radial load, since the reaction angles and, thus, the axial components of the load are increased in a higher degree than is the elastic compression.

As mentioned, the relation between the radius of curvature of the generatrix of the roller and the radius of curvature of the generatrix of the races ought to be such that the axial extension of the contact surface will be equal to or greater than the width of the recesses 6 and 7 in the race rings 1 and 2, before the stress in the ring material reaches the limit of elasticity or exhaustion, so that mere breaking phenomena are avoided. Besides, the rollers may, as mentioned, preferably be constructed in such manner that the difference between the said radii of curvature will be such a one that at greater loads contact takes place along a greater part of the length of the roller, whereas at lower loads contact takes place along a small part only of the length of the roller.

The invention is evidently applicable also to other types of radial roller bearings than that shown and to axial roller bearings, and also to ball bearings.

What I claim as new and desire to secure by Letters Patent of the United States of America is:—

1. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion.

2. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said rolling bodies being provided with axially disposed apertures of such a shape that the bending elasticity also of the said bodies can be utilized.

3. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said rolling bodies being provided with concentrically disposed recesses in their end surfaces of such a shape that the bending elasticity can be utilized also at the ends of the said bodies.

4. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said rolling bodies being provided with axially disposed apertures and with concentrically disposed recesses in their end surfaces, said apertures and said recesses having such a shape that the bending elasticity of the said bodies can be utilized.

5. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, the difference between the said radii of curvature being such that upon greater loads contact takes place along the greater part of the length of the rolling body, without exceeding the limit of elasticity, whereas at lower loads contact takes place along a small part only of the length of the said body.

6. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and the length of said rolling body being smaller than the diameter thereof.

7. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said rolling bodies being provided with axially disposed apertures of such a shape that the bending elasticity also of the said bodies can be utilized, the length of said rolling bodies being smaller than the diameter thereof.

8. An antifriction bearing comprising race rings and rolling bodies placed between said race rings, the races of said rings and the rolling bodies having a curved generatrix and at least one of said race rings having at the side opposite to its race, an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said rolling bodies being provided with concentrically disposed recesses in their end surfaces of such a shape that the bending elasticity can be utilized also at the ends of the said bodies, the length of said body being smaller than the diameter thereof.

9. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said rolling bodies being provided with axially disposed apertures and with concentrically disposed recesses in their end surfaces, said apertures and said recesses having such a shape that the bending elasticity of the said bodies can be utilized, the length of said rolling body being smaller than the diameter thereof.

10. An antifriction bearing comprising race rings and rolling bodies placed between said race rings, the races of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, and said race rings being so constructed that the maximum bending stress (tension stress) in the material of the said rings will always be less than the maximum tension stress between the rolling body and the race ring.

11. An antifriction bearing comprising race rings and apertured rolling bodies placed between said race rings, the recess of said rings and the rolling bodies having a curved generatrix and at least one of said race rings having at the side opposite to its race an annular recess, the width of said recess and the relation between the radius of curvature of the generatrix of the rolling body and the radius of curvature of the generatrix of the race being such that upon a certain load the axial extension of the contact surfaces between the race and the rolling body will be at least equal to the width of said recess in the race ring, before the stress in the ring material reaches the limit of elasticity or exhaustion, the relation between the diameter of the aperture in the rolling body and the length and the diameter of the said body being such that the maximum stress in the material of the rolling body will always be less than the maximum tension stress in the contact surface between the said body and the race ring.

In testimony whereof I affix my signature.

KARL OSKAR LEON.